United States Patent [19]

Ohta et al.

[11] Patent Number: 5,126,332
[45] Date of Patent: Jun. 30, 1992

[54] FOOD COMPOSITIONS FOR THE PREVENTION OF OVEREATING

[75] Inventors: Atsutane Ohta, Tokyo; Toru Aoki, Urawa, both of Japan

[73] Assignee: Terumo Kabushiki Kaisha, Tokyo, Japan

[21] Appl. No.: 335,537

[22] PCT Filed: Aug. 28, 1987

[86] PCT No.: PCT/JP87/00641
§ 371 Date: Feb. 28, 1989
§ 102(e) Date: Feb. 28, 1989

[87] PCT Pub. No.: WO88/01477
PCT Pub. Date: Mar. 10, 1988

[30] Foreign Application Priority Data

Sep. 1, 1986 [JP] Japan .................. 61-203621
Mar. 20, 1987 [JP] Japan .................. 62-64026

[51] Int. Cl.⁵ .................. A23L 1/305; A23L 1/308; A61K 31/715
[52] U.S. Cl. .................. 514/54; 426/804; 426/805; 424/439; 514/866; 514/909; 514/911; 536/112; 536/114
[58] Field of Search .................. 426/804, 805; 424/439; 536/112, 114; 514/54, 909, 911, 866

[56] References Cited

U.S. PATENT DOCUMENTS

| | | | |
|---|---|---|---|
| 4,232,054 | 11/1980 | Durlach | 426/618 |
| 4,251,550 | 2/1981 | Proctor | 426/658 |
| 4,401,682 | 8/1983 | Battista | 426/804 |
| 4,496,606 | 1/1985 | Michnowski | 426/810 |
| 4,530,850 | 7/1985 | Trop | 426/658 |
| 4,559,233 | 12/1985 | Chen et al. | 426/802 |
| 4,582,710 | 4/1986 | Ooraikui et al. | 426/573 |
| 4,619,831 | 10/1986 | Sharma | 426/804 |
| 4,631,196 | 12/1986 | Zeller | 426/583 |
| 4,643,908 | 2/1987 | Sawhill | 426/805 |
| 4,656,046 | 4/1987 | Yagi et al. | 426/802 |
| 4,833,128 | 5/1989 | Solomon et al. | 426/804 |
| 4,904,495 | 2/1990 | Spanier | 426/805 |
| 4,935,250 | 6/1990 | Cox | 426/805 |

FOREIGN PATENT DOCUMENTS 62-12984 3/1987 Japan .

*Primary Examiner*—Ronald W. Griffin
*Attorney, Agent, or Firm*—Burns, Doane, Swecker & Mathis

[57] ABSTRACT

Food compositions comprising a composition containing a water-soluble dietary fiber and protein with an isoelectric point in acidic region, contents of said water-soluble dietary fiber and said protein being in such a ratio as forming gel when an aqueous solution of said composition gets in touch with gastric juice.

The food compositions are orally received in aqueous solution after dissolved in hot water. Being an aqueous solution facilitates intake and gel formation in the stomach allows retention in the stomach for a long period of time thereby preventing overeating. Moreover, the gel absorbs saccharide contained in other food and drink staying in the stomach thereby delaying absorption of saccharide into the body.

As examples of the water-soluble dietary fiber are mentioned carrageenan and guar gum, and as examples of the protein are mentioned casein and salts thereof. Weight ratio of the water-soluble dietary fiber to the protein is about 1:0.5–1:8.

16 Claims, 8 Drawing Sheets

FOOD COMPOSITIONS FOR THE PREVENTION OF OVEREATING

TECHNICAL FIELD

The present invention relates to food compositions. Food compositions of the invention are useful as food for the prevention of overeating. Moreover, the present compositions are useful as food for preventing rapid increase in blood glucose level in patients with glucose intolerance such as patients with diabetes mellitus.

BACKGROUND OF ART

With increase in obesity patients in recent years, obesity has become a serious problem for public health. As onset of obesity is due to excess in calorie intake in most cases, the most effective means for treating or preventing obesity is decrease in calorie intake.

Patients will complain of strong feeling of hunger when calorie intake is decreased, and alleviation of the feeling is considered to be a top-priority problem.

It has long been known that mechanical extension of the stomach inhibits appetite. In this respect, there are employed the balloon method in which a balloon is detained inside the stomach or the stapler method in which a greater part of the stomach is obstructed to much reduce volume of the stomach so that intake of even a small amount of food exerts stimulation of mechanically extending the stomach.

However, these methods are not desirable in that they are a permanent treatment requiring surgical operation and are possibly associated with side reactions.

There are also commercialized a large number of foods containing a viscous dietary fiber for the therapy of obesity. They are not satisfactory in controlling appetite because of their shorter retention time in the stomach. In addition, although retention time in the stomach can be prolonged as the viscosity increases, highly viscous dietary fiber solution was difficult to receive and was also problematic in taste.

Diabetes mellitus is treated by reduction of diet. The disease is broadly divided into insulin-dependent diabetes (lean type) and insulin-independent diabetes (fat type), in both of which marked reduction of glucose tolerance in patients causes rapid rise in blood glucose level if ordinary food is taken in an ordinary manner thereby developing symptom of hyperglycemia. The hyperglycemia will eventually induce concurrent diseases such as retinitis, nephropathy and disturbance of consciousness. Diabetic patients, especially insulin-dependent diabetic patients, therefore, are treated in such a way that required calorie is given in divided doses in order to prevent rapid rise of blood glucose level. This is troublesome to both the patient and his family.

Dietary fiber is used as food material for patients with glucose intolerance with an attempt to delay absorption of saccharide. Since delivery fiber must be given in a large amount for such a purpose, it is difficult to receive it.

Moreover, intake of a large amount of a dietary fiber inhibits intestinal absorption of nutrients to cause malnutrition of the patient.

BRIEF DESCRIPTION OF THE DRAWINGS

FIG. 7($a$) and 7($b$) are graphs of blood glucose levels for two food preparations in two subjects.

FIG. 8($a$) and 8($b$) are block charts of the percent of glucose remaining in the stomach for three samples after two time intervals.

DISCLOSURE OF THE INVENTION

It is an object of the present invention to provide food compositions for the prevention of overeating which exert a very long retention in the stomach, are excellent in taste acceptability, and contain protein of high nutritive value so that they are useful for the treatment or prevention of obesity.

Another object of the invention is to provide food compositions which is capable of preventing rapid rise of blood glucose level in patients with glucose intolerance.

These objects are achieved by food compositions of the invention which are constructed as set forth below.

(1) A food composition comprising a water-soluble dietary fiber and protein with an isoelectric point in acidic region contents of said water-soluble dietary fiber and said protein being in such a ratio as forming gel when an aqueous solution of said composition gets in touch with gastric juice.

(2) A food composition according to the above item (1) wherein the water-soluble dietary fiber is carrageenan or guar gum.

(3) A food composition according to the above item (1) wherein the protein is casein or a salt thereof.

(4) A food composition according to the above item (1) wherein weight ratio of the water-soluble dietary fiber to the protein is 1:0.5–1:8.

(5) A food composition according to the above item (4) wherein weight ratio of the water-soluble dietary fiber to the protein is 1:0.5–1:2.

As described above, the present invention relates to food compositions containing a water-soluble dietary fiber and protein with an isoelectric point in acidic region.

It is preferable to use carrageenan or guar gum as the water-soluble dietary fiber in the invention. Use of carrageenan is especially preferable. Dietary fiber is a substance to which attention has been called in recent years because of the action of improving metabolism of carbohydrate or lipid.

The protein used in the invention is one which has an isoelectric point in acidic region and is preferably casein or a salt thereof, e.g. sodium caseinate or calcium caseinate. Ratio of the water-soluble dietary fiber to the protein is determined so as to form gel when an aqueous solution of the present composition gets in touch with gastric juice. Such ratio is in the range of about 1:0.5 to 1:8 by weight, although it is variable depending upon nature of the dietary fiber or the protein and combination of the two.

If the amount (weight) of the protein is below half as much as that of the water-soluble dietary fiber, aqueous solution of the present composition will remain liquid instead of forming gel when contacted with gastric juice. If it is over octupus as much, the protein will be precipitated and separated from the dietary fiber thereby forming no gel.

It has been found that when the above-mentioned weight ratio of the dietary fiber to the protein in the present composition is 1:0.5-1:2, saccharide is highly migratory to the gel formed in the stomach. Therefore, the gel absorbs saccharide contained in other food and drink staying in the stomach to delay saccharide absorption into the body, thereby enabling prevention of rapid rise of blood glucose level in diabetic patients.

Compositions of the invention are given in solution in hot water. Concentration of said dietary fiber and protein in total in the solution is approximately 0.5-5 w/v %. In a concentration below 0.5%, the gel formation in the stomach will not be satisfactory, and in a concentration over 5%, gelatinized food which is difficult to take will be formed.

To the food according to the invention may also be added seasonings and spices provided that they will not be adverse to the objects of the invention. As the seasonings may be employed one or combination of two or more of any of salt, soy sauce, sodium glutamate, vinegar, sweet sake (mirin), sake, miso and other conventionally used seasonings. As the spices may be employed one or combination of two or more of any of mustard, garlic, cur y, pepper and other conventionally used spices.

The materials used in the invention are of low taste substance and may be seasoned by addition of a small amount of various seasonings. They can be given without care even if patients are prescribed with limited salt.

In addition, other nutrient components, e.g., carbohydrates, vitamins and minerals may be added.

It is to be noted that for the purpose of allowing absorption of saccharide contained in other food and drink, saccharide content of the composition of the invention should of course be maintained minimum.

Test Example

Change of viscosity associated with changes of temperature and pH in precooked corn potage soup which has a higher viscosity among commercially available precooked soups was measured.

In 450 ml of hot water at 80° C. were dissolved three packs of a commercially available precooked corn potage products each weighing 15.6 g, 46.8 g in total. The solution was then measured for viscosity at 70° C., usual intake temperature and at 40° C., temperature inside the stomach. To the above-mentioned solution, further at 40° C., was added 1N HCl at a flow rate of 0.5 ml/min. which stirring by a peristaltic pump to slowly reduce the pH, and change of viscosity with reduction in pH was measured. The viscosity measurement was made by using VISMETRON rotary viscometer model VGA. Results are shown in FIG. 1.

Figure 1:
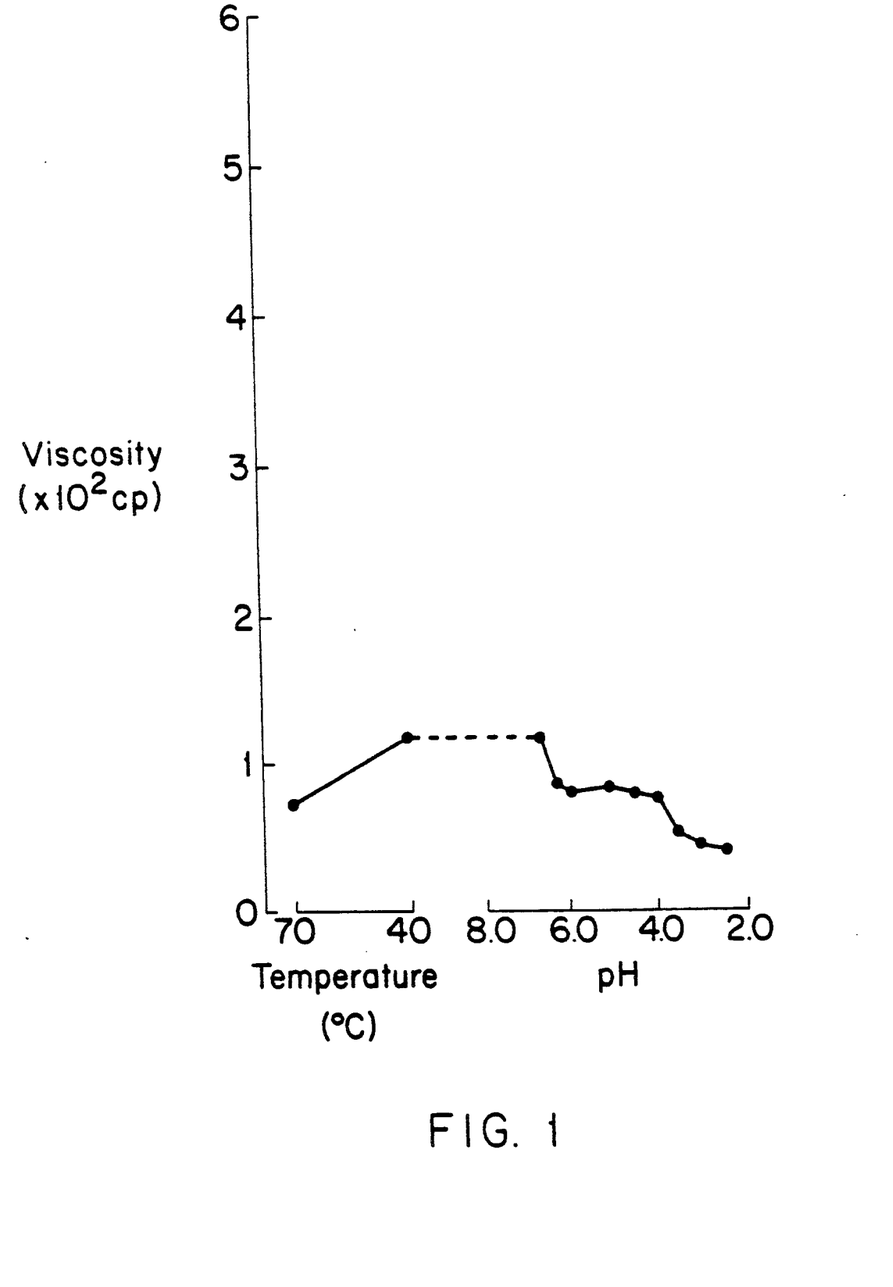
FIG. 1 is a graph of the viscosity associated with a change in temperature and pH in precooked corn potage soup.

As clearly seen from FIG. 1, the temperature reduction (70° C.→40° C.) induced approximately doubled increase in viscosity, but the viscosity had a tendency rather to reduce with lowering in pH.

It was therefore concluded that viscosity of the above-mentioned food when received was reduced with the reduction of pH by gastric juice, which is unfavorable viewed from retention time in the stomach.

On the contrary, an aqueous solution of the food compositions of the invention, as shown later, has an increased viscosity in the stomach by reduction in temperature. Further, the viscosity was rapidly increased by the pH reduction caused by gastric juice.

The invention will be described in more details below with reference to examples.

EXAMPLE 1

A food composition was prepared by blending 4 g of carrageenan CS-215 (manufactured by SAN-EI Chemical Industries, Ltd.) and 2 g of sodium caseinate (manufactured by WAKO PURE CHEMICAL INDUSTRIES, LTD.). The composition was dissolved in 500 ml of distilled water heated to 80° C. Measurements were made of the solution for viscosity at 70° C., usual intake temperature and at 40° C., temperature in the stomach.

To the solution, further at 40° C., was added 1N HCl at a rate of 0.5 ml/min. while stirring by a peristaltic pump. Change of viscosity was measured with the reduction in pH. Results are shown in FIG. 2.

Figure 2:
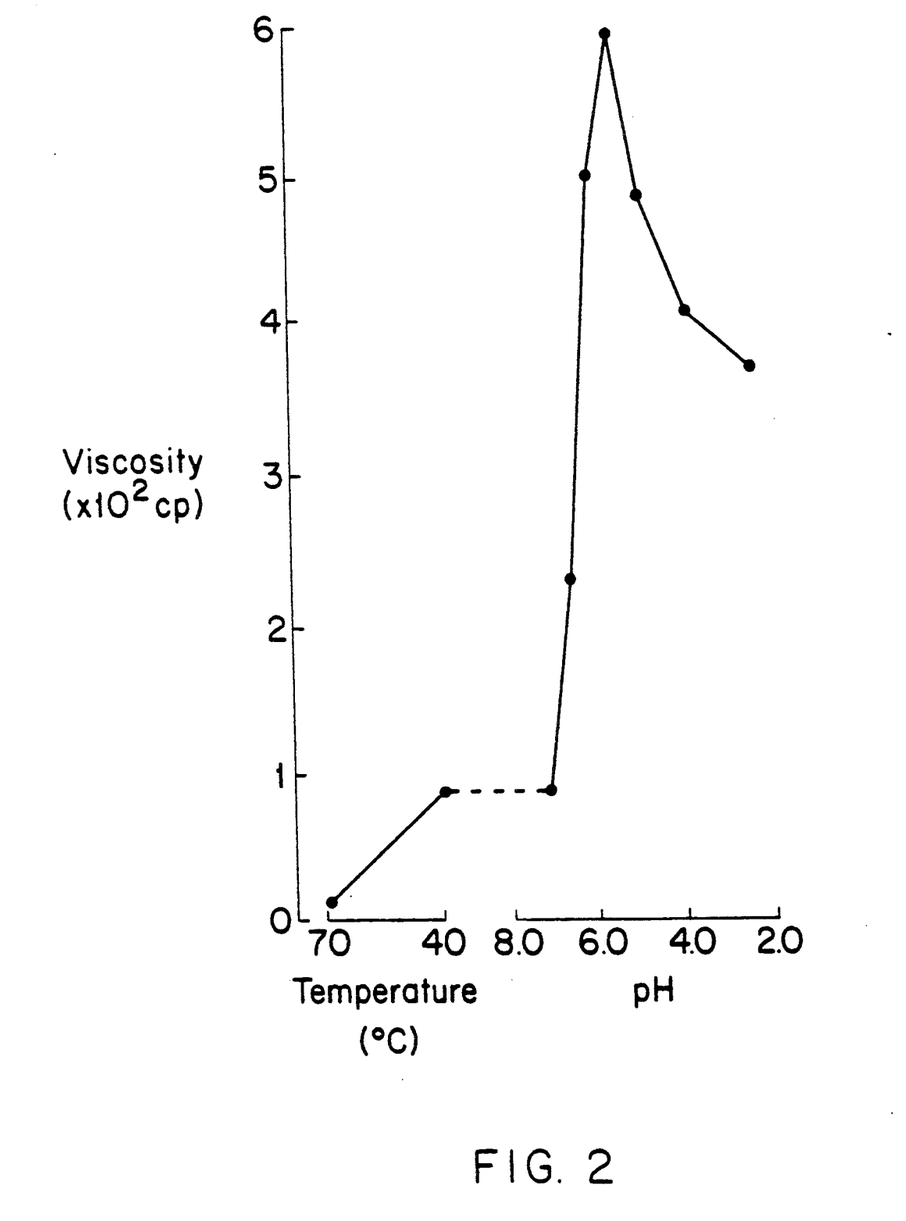
FIG. 2 is a graph of the viscosity associated with a change in temperature and pH in a carrageenan/sodium caseinate food composition.

As clearly seen from FIG. 2, viscosity of the food composition according to the invention was increased approx-imately sevenfold with the temperature reduction (70° C.→40° C.). Moreover, the viscosity was much increased with the reduction in pH to a maximum of approximately 55-fold as high as the viscosity prior to the addition of HCl.

EXAMPLE 2

A food composition and its aqueous solution were prepared by using 1.75 g of guar gum VISTOP®T-20 (manufactured by SAN-EI Chemical Industries, Ltd.) and 10 g of sodium caseinate. Change of viscosity with reduction in temperature and change of viscosity with reduction in pH were measured in the same way as in Example 1. Results are shown in FIG. 3.

Figure 3:
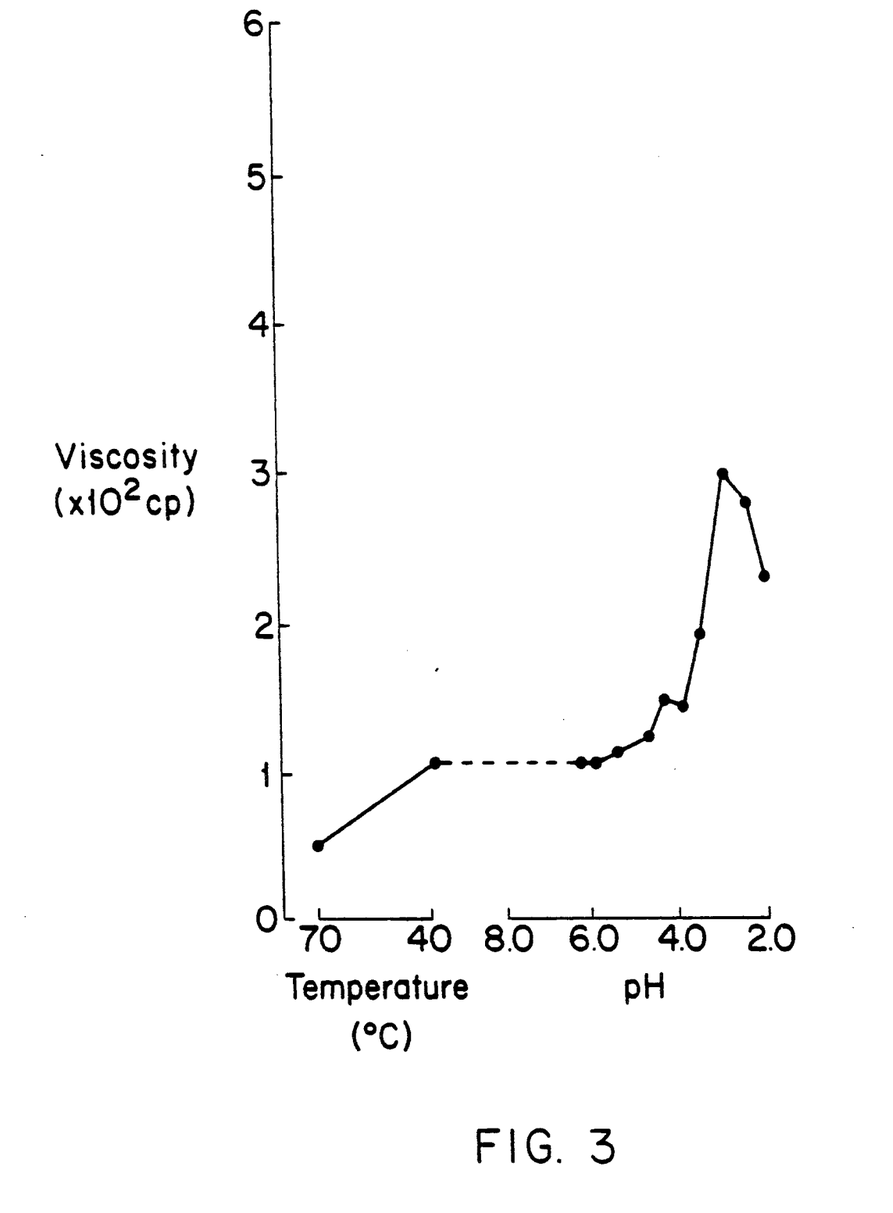
FIG. 3 is a graph of the viscosity associated with a change in temperature and pH in a guar gum/sodium caseinate composition.

As clearly seen from FIG. 3, viscosity of the solution was increased with the temperature reduction (70° C.→40° C.) approximately 5-fold as high as the initial. Moreover, the viscosity was much increased with the reduction in pH to a maximum of approximately 15-fold as high as the viscosity prior to the addition of HCl.

It was found in Examples 1 and 2 that an aqueous solution of the water soluble dietary fiber and the protein has a low viscosity at the temperature when received (70° C.), a much increased viscosity at the temperature in the stomach (40° C.) and also a much increased viscosity associated with reduction in pH.

EXAMPLE 3

Into eight 500-ml beakers were divided 3.5 g each of carrageenan CS-56 (manufactured by SAN-EI Chemical Industries, Ltd.), which was dissolved in 300 ml of water. To the beakers were added 0, 0.5, 1.0, 1.5, 2.0, 2.5, 3.0 and 3.5 g of sodium caseinate (manufactured by WAKO PURE CHEMICAL INDUSTRIES, LTD.), respectively, followed by dissolution and addition of water to 500 ml.

Figure 4:
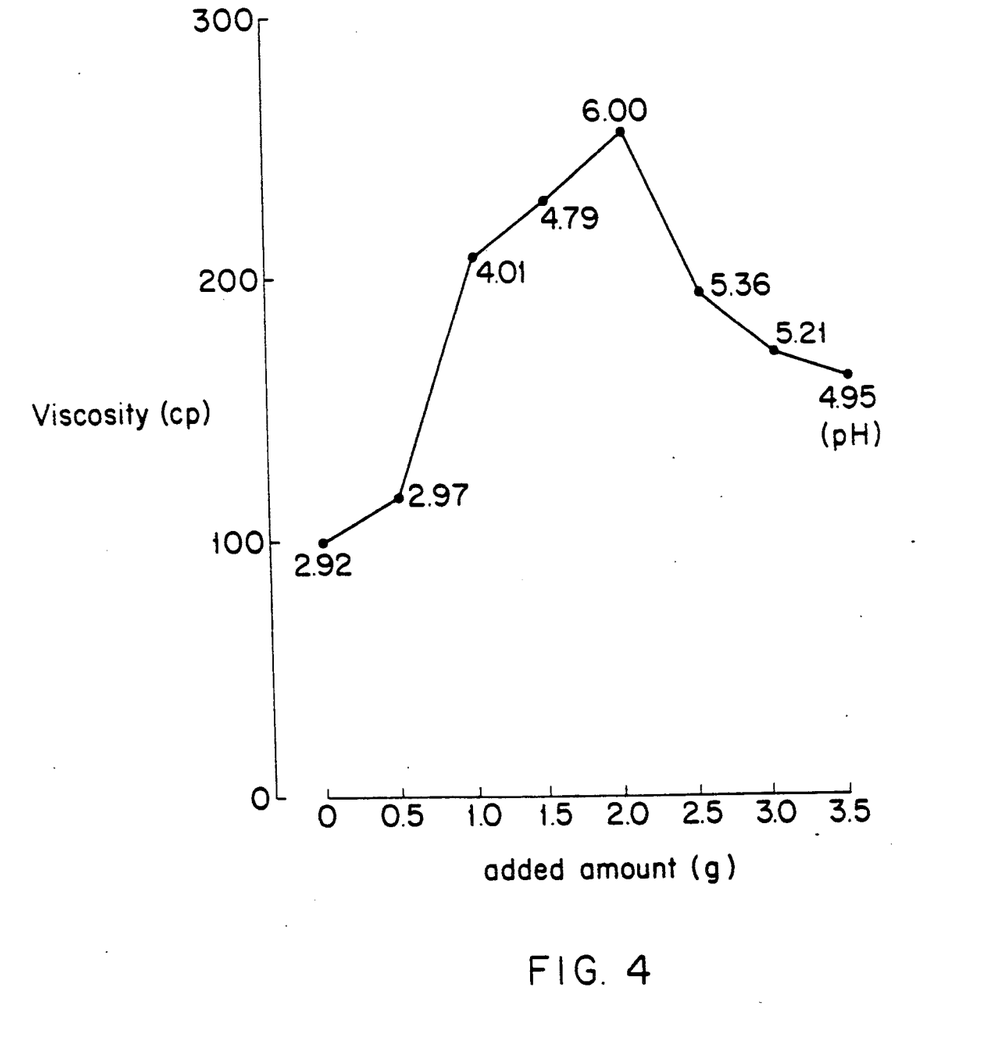
FIG. 4 is a graph of the viscosity characteristics of a solution after the addition of sodium caseinate.

To each of the solutions was dropwise added 1N HCl at a rate of 0.5 ml/min. while stirring by a peristaltic pump to measure change of viscosity with reduction in pH. The measurement was conducted by using VISMETRON rotary viscometer model VGA. Results are shown in FIG. 4. In the figure the vertical axis indicates viscosity, and the horizontal axis indicates amount of the sodium caseinate added. Numerals in the figure indicate pH at a time when each solution had a maximum viscosity.

As clearly seen from FIG. 4, viscosity characteristic of the solution was favorable when the sodium caseinate was added in an amount of 1.0-2.0 g. In terms of the concentration, a concentration in the range of 0.2-0.5 w/v % is favorable. It must be 2% or lower at highest.

EXAMPLE 4

Three 50-ml measuring flasks were used. In the first was placed 5 g of glucose, in the second 5 g of glucose and 0.5 g of carrageenan CS-215 (manufactured by SAN-EI Chemical Industries, Ltd.) and in the third 5 g of glucose, 0.5 g of carrageenan CS-215 and 0.25 g of sodium caseinate (manufactured by WAKO PURE CHEMICAL INDUSTRIES, LTD.). The content in each of the flasks was dissolved in distilled water and diluted with additional distilled water to 50 ml. The three samples were given to mice in order to compare retention time in the stomach.

Three groups of 9 mice, 27 mice in total were fasted for 18 hours and subjected to abstinence from feed and water for additional one hour. The mice were forced by an administrating tube to receive one of the samples at a dose of 0.5 ml/10 g bodyweight.

Fifteen minutes after the administration, the abdomen was opened and obstruction of the esophagus and the pylorus using a clamp followed by quick excision of the stomach. Content of the excised stomach was washed with distilled water to a final volume of the washing of 10 ml, which was then placed in a test tube.

The solution was centrifuged at 3,000 rpm for 10 min. to precipitate insolubles. The supernatant was measured for glucose content by the mutarotase-GOD method to determine the proportion remaining in the stomach for each sample. Results are shown in FIG. 5.

Figure 5:
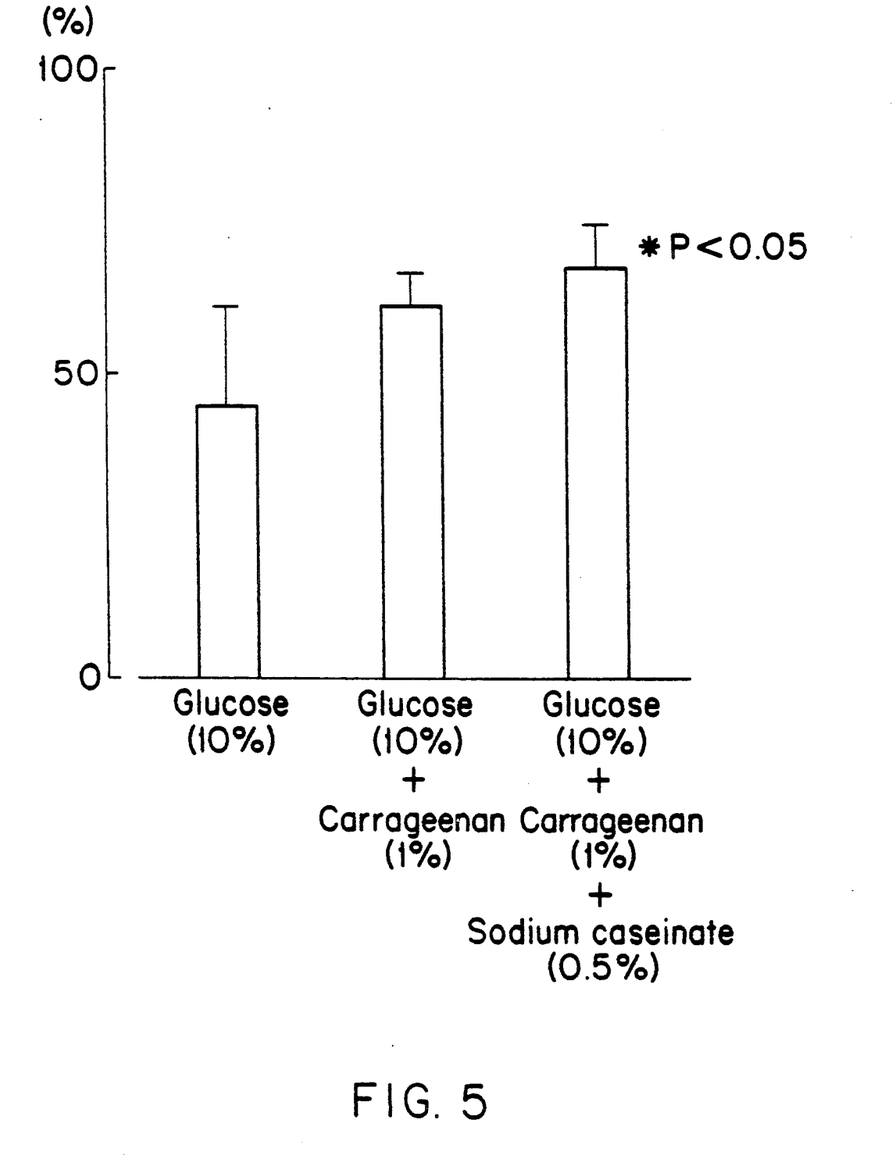
FIG. 5 is a block chart for three samples of the percent of glucose remaining in an artificial stomach.

As shown in FIG. 5, the group receiving 10% glucose, 1% carrageenan and 0.5% of sodium caseinate had a significantly higher remaining proportion as compared with other two groups.

It was also demonstrated that the content remaining in the stomach gelled completely for the group receiving the above-mentioned sample composed of glucose, carrageenan and sodium caseinate.

EXAMPLE 5

Seven 50-ml measuring flasks were used. In each of the flasks were placed 0.25 g of carrageenan CS-215 (manufactured by SAN-EI Chemical Industries, Ltd.) and 3 g of glucose of 2.5 g, 2 g, 1.5 g, 1 g, 0.5 g, 0.25 g and 0.125 g of sodium caseinate (manufactured by WAKO PURE CHEMICAL INDUSTRIES, LTD.), respectively. To the flask was added distilled water, and the mixture was heated to a solution, the volume of which was then adjusted to 50 ml. Ratios of the carrageenan to the sodium caseinate incorporated in the solution are 1:10, 1:8, 1:6, 1:4, 1:2, 1:1 and 1:0.5, respectively. The solution was divided in an amount of 2 ml into glass test tubes each 1.3 cm in inner diameter and 10 cm in length. The test tubes were heated in a thermostatic chamber at 40° C. To each of the test tubes was added 2 ml of artificial gastric juice heated in advance to 40° C. (J.P., Solution I for the disintegration test) slowly along the wall of the tube. Consequently, there was rapidly formed a gel layer on the interface of the two liquids. Five and 10 minutes after the addition of artificial gastric juice, 20 $\mu$l of the liquid in the artificial gastric juice layer was removed from each of the test tubes and measured for glucose concentration. The glucose concentration measurement was conducted using the mutarotase-GOD method.

The mutarotase method is a glucose assay method using a highly purified porcine kidney mutarotase combined with glucose oxidase, peroxidase, 4-aminoantipyrine and phenol.

Figure 6:
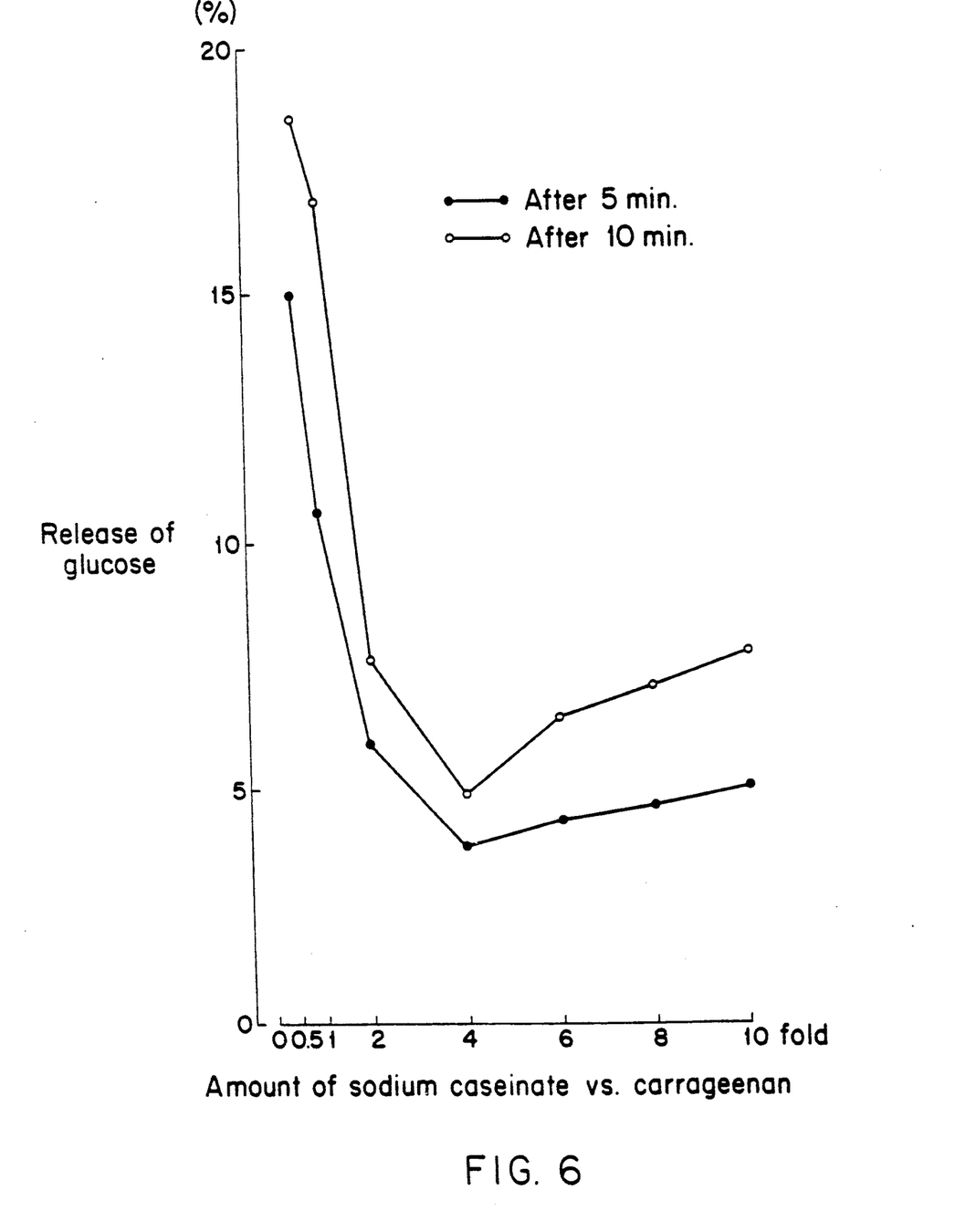
FIG. 6 is a graph of the migration rate of glucose into artificial gastric juice at two time intervals.

Results are shown in FIG. 6. As shown in FIG. 6, the migration rate of glucose from the present composition to the artificial gastric juice was high with a ratio of the carrageenan to the sodium caseinate incorporated in the range of 1:0.5-1:2. The data indicate that migration of saccharide to the gel formed is easy with a ratio of incorporation in the above-defined range.

EXAMPLE 6

Two 500-ml beakers were used. In one of the beakers were placed 1.6 g of carrageenan CS-215 (manufactured by SAN-EI Chemical Industries, Ltd.), 2 g of sodium caseinate and 4.7 g of a consomme seasoning (manufactured by FUJI FOODS CORPORATION). The content was dissolved in hot water followed by volume adjustment to 400 ml to obtain a food preparation of the invention. In the other beaker was placed 4.7 g of the consomme seasoning alone. It was dissolved in hot water followed by volume adjustment to 400 ml which was used as control. The food preparation of the invention and the control preparation were given for comparison to two test subjects, a diabetic patient and a person with glucose intolerance.

The diabetic patient fasted since dinner on the previous day was given 200 ml of the food preparation of the invention, and the person with glucose intolerance 200 ml of the control preparation promptly followed by administration of 225 ml of Trelan-G ® (manufactured by Shimizu Seiyaku K. K.), a starch hydrolyzate solution for glucose loading test. Prior to, and 30 min., 60 min., 90 min., 120 min. and 180 min. after the administration, respectively, blood was collected from the vein of an upper arm, and serum was separated for measurement of the blood glucose level. The blood glucose measurement was conducted by the mutarotase-GOD method.

One week after the above test, the same diabetic patient was given 200 ml of the control preparation, and the same person with glucose intolerance 200 ml of the food preparation of the invention. Test was carried out in the same way as above.

Figure 7A:
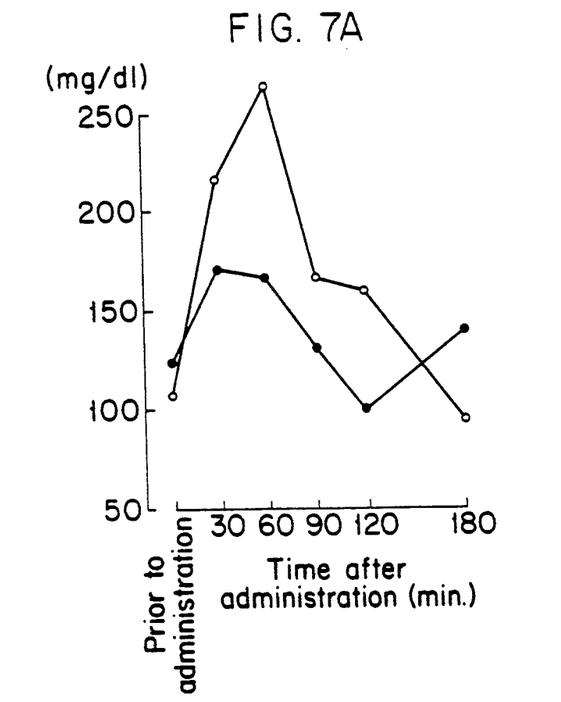
Figure 7B:
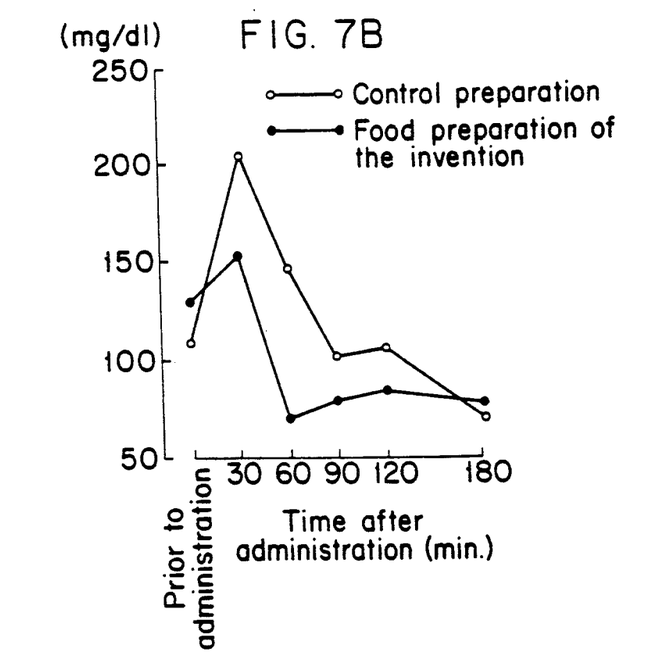

Results are shown in FIG. 7. As shown in FIG. 7, blood glucose level in both of the test subjects was lower when the food preparation of the invention was given than when the control preparation was given. The data indicate that administration of a food preparation of the invention remarkably improves glucose tolerance.

EXAMPLE 7

Three 50-ml measuring flasks were used. In the first flask was placed 5 g of glucose, in the second one 5 g of glucose and 0.2 g of carrageenan CS-215 (manufactured by SAN-EI Chemical Industries, Ltd.) and in the third one 5 g of glucose, 0.2 g of carrageenan CS-215 and 0.25 g of sodium caseinate (manufactured by WAKO PURE CHEMICAL INDUSTRIES, LTD.). To each of the flasks was further added 1.25 g of a consomme seasoning (manufactured by FUJI FOODS CORPORATION), and the mixture was dissolved by addition of distilled water followed by volume adjustment with distilled water to 50 ml. Rats were given the three samples for comparison of retention time in the stomach.

Three groups of 12 rats, 36 rats in total were used. The rats were fasted for 18 hours and subjected to abstinence from feed and water for additional one hour. The rats were forced by an administrating tube to receive one of the above-mentioned samples at a dose of 0.5 ml/10 g bodyweight.

Thirty minutes and 60 min. after the administra-tion, respectively, the abdomen was opened and obstruction of the esophagus and the pylorus using a clamp followed by quick excision of the stomach. Content of the excised stomach was washed with distilled water to a final volume of the washing of 10 ml, which was then placed in a test tube.

The solution was centrifuged at 3,000 rpm for 10 min. to precipitate insolubles. The supernatant was measured for glucose content by the mutarotase-GOD method to determine the proportion remaining in the stomach for each sample administered. Results are shown in FIG. 8.

Figure 8A:
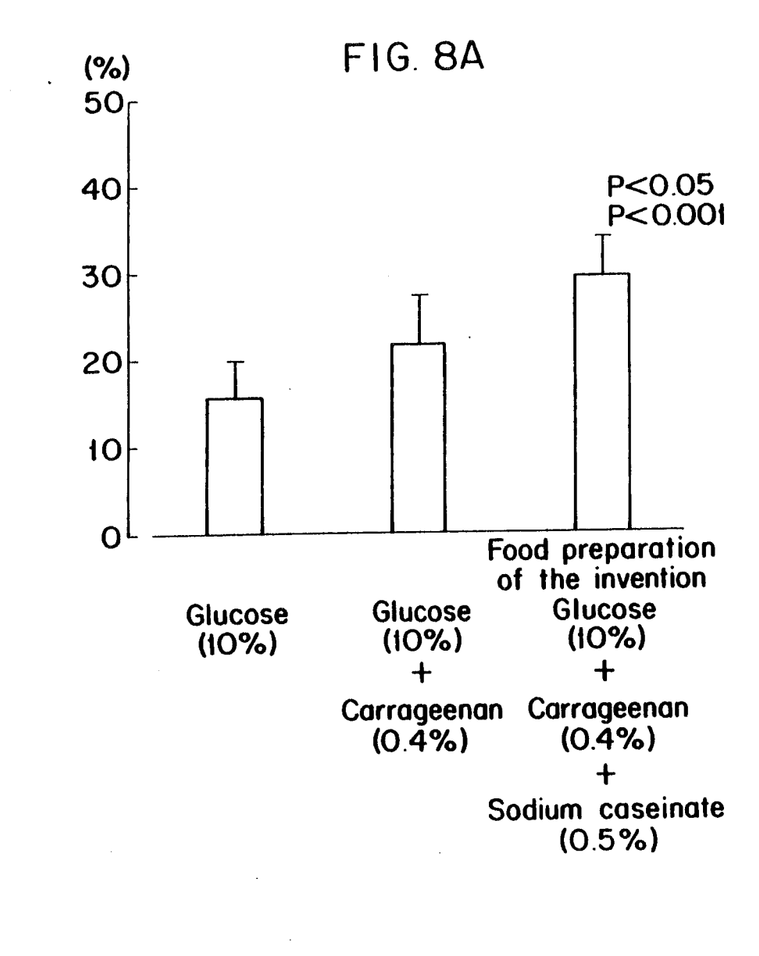
Figure 8B:
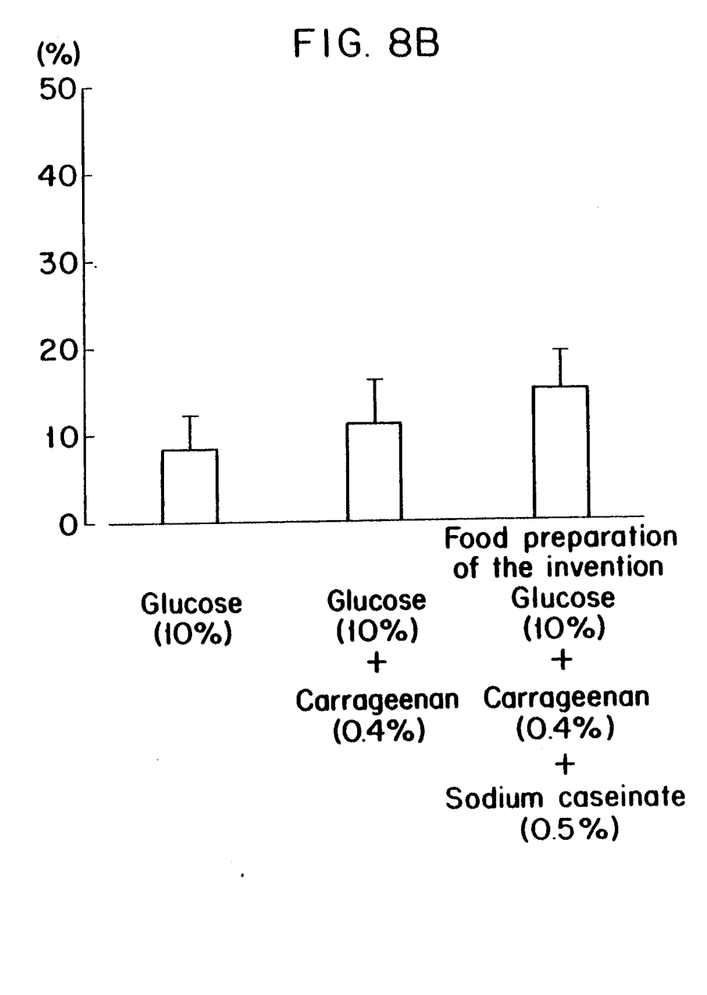

As shown in FIG. 8, the group receiving 10% glucose, 0.4% carrageenan and 0.5% sodium caseinate had a significantly higher remaining proportion 30 min. after the administration as compared with other two groups. A similar tendency was also observed 60 min. after the administration.

It was also demonstrated that the content remaining in the stomach gelled completely in case of the group receiving the above-mentioned sample composed of glucose, carrageenan and sodium caseinate.

As described above in detail, the food compositions according to the invention contain a water-soluble dietary fiber and protein with an isoelectric point in acidic region so that they form gel in the stomach by temperature reduction occurring during and after intake (intragastric) as well as by contact with gastric juice. Since retention time of the intake in the stomach usually becomes longer as viscosity of the intake is higher, a food preparation containing a composition of the invention dissolved in water, when received prior to meal or together with other food, imparts a long-lasting mechanically-extending stimulation to the stomach even if other food is given in a small amount. The stimulation will permit inhibition of appetite which eventually prevents overeating. As the viscosity is much increased in the stomach, a lower viscosity preparation is acceptable when it is given. Therefore, the compositions of the invention are more favorably orally received and give superior taste acceptance in comparison with the prior-art compositions.

The gel of a composition of the invention formed in the stomach is also characterized by a high saccharide permeability and a good retention of water. Therefore, they are capable of absorbing and holding saccharide contained in other food and drink that stay in the stomach thereby delaying saccharide absorption into the body and preventing rapid rise of the blood glucose level. In this respect, they can effectively alleviate hyperglycemia observed in patients suffering from obesity or patients with glucose intolerance such as diabetic patients.

Since the gel of a composition of the invention formed in the stomach is easily disintegrated when contacted with intestinal fluids so that absorption of nutrient compositions in the intestines is not inhibited with no possibility for the patient to be in malnutrition.

INDUSTRIAL APPLICABILITY

The food compositions of the present invention are useful as food for preventing overeating as well as for preventing rapid rise of blood glucose level in patients with glucose intolerance such as diabetic patients. Such food compositions of the invention are prepared in industrial fields such as food industry and pharmaceutical industry.

What is claimed is:

1. A food composition comprising casein or a salt thereof and a water-soluble dietary fiber selected from the group consisting of carrageenan and guar gum, wherein the weight ratio of the water-soluble dietary fiber to the casein or salt thereof is 1:0.5–1:2.

2. The food composition as claimed in claim 1, wherein said water-soluble dietary fiber is carrageenan.

3. The food composition as claimed in claim 1, wherein said casein or a salt thereof is sodium caseinate.

4. The food composition as claimed in claim 1, wherein said composition is an aqueous solution.

5. The food composition as claimed in claim 4, wherein the concentration of the casein and the dietary fiber are in the range of approximately 0.5–5 w/v %.

6. The food composition as claimed in claim 1 further comprising a seasoning or spice.

7. The food composition as claimed in claim 6, wherein said seasoning is selected from the group consisting of salt, soy sauce, sodium glutamate, vinegar, sweet sake, sake, miso and any combination thereof.

8. The food composition as claimed in claim 6, wherein said spice is selected from the group consisting of mustard, garlic, curry, pepper and any combination thereof.

9. A method for preventing overeating and preventing a rapid increase in blood glucose levels, said method comprising administering a food composition comprising casein or a salt thereof and a water-soluble dietary fiber selected from the group consisting of carrageenan and guar gum, wherein the weight ratio of the water-soluble dietary fiber to the casein or salt thereof is 1:0.5–1:2.

10. The method as claimed in claim 9, wherein said water-soluble dietary fiber is carrageenan.

11. The method as claimed in claim 9, wherein said casein or a salt thereof is sodium caseinate.

12. The method as claimed in claim 9, wherein said composition is an aqueous solution.

13. The method as claimed in claim 9, wherein the concentration of the casein and dietary fiber are in the range of approximately 0.5–5 w/v %.

14. The method as claimed in claim 9 further comprising seasoning or spice.

15. The method as claimed in claim 14, wherein said seasoning is selected from the group consisting of salt, soy sauce, sodium glutamate, vinegar, sweet sake, sake, miso and any combination thereof.

16. The method as claimed in claim 14, wherein said spice is selected from the group consisting of mustard, garlic, curry, pepper and any combination thereof.

* * * * *